June 30, 1959 W. PERA 2,892,978
PHOTOGRAPHIC MULTIMETER
Filed Oct. 26, 1954 2 Sheets-Sheet 1

INVENTOR,
WILLIAM PERA.
BY
Harry M. Saragovitz
ATTORNEY.

June 30, 1959     W. PERA     2,892,978
PHOTOGRAPHIC MULTIMETER

Filed Oct. 26, 1954     2 Sheets-Sheet 2

*INVENTOR.*
WILLIAM PERA
BY
Harry M. Saragovitz
*ATTORNEY*

United States Patent Office 2,892,978
Patented June 30, 1959

2,892,978

PHOTOGRAPHIC MULTIMETER

William Pera, United States Army

Application October 26, 1954, Serial No. 464,916

12 Claims. (Cl. 324—73)

(Granted under Title 35, U.S. Code (1952), sec. 266)

The invention herein described may be manufactured and used by or for the Government of the United States for governmental purposes without payment to me of any royalty thereon.

This invention relates to a photographic multimeter and concerns particularly a combined exposure meter, battery tester and flashbulb tester.

In the photographic art, an exposure meter customarily serves to provide a reading of light values in order to determine the photographic exposures necessary. In addition, it is frequently necessary to provide means for testing batteries required for both low voltage and battery-capacitor type flash guns. It is further frequently necessary to provide means for testing the continuity of photoflash bulbs.

It is therefore an object of this invention to provide a photographic multimeter capable of performing the functions of exposure meter, battery tester and photoflash bulb continuity tester.

It is a further object of this invention to provide a photographic multimeter affording increased accuracy and convenience of size and operation.

An additional object of this invention is to provide a batteryless photoflash bulb continuity tester.

An additional object of this invention is to provide a combined exposure meter and continuity tester.

An additional object of this invention is to provide a combined exposure meter and battery tester.

A better understanding of the invention will be afforded by the following detailed description when read in connection with the accompanying drawings in which.

The invention will first be described in connection with Fig. 1, it being understood that the various elements are schematically illustrated to facilitate explanation and understanding of the invention.

Figure 1:
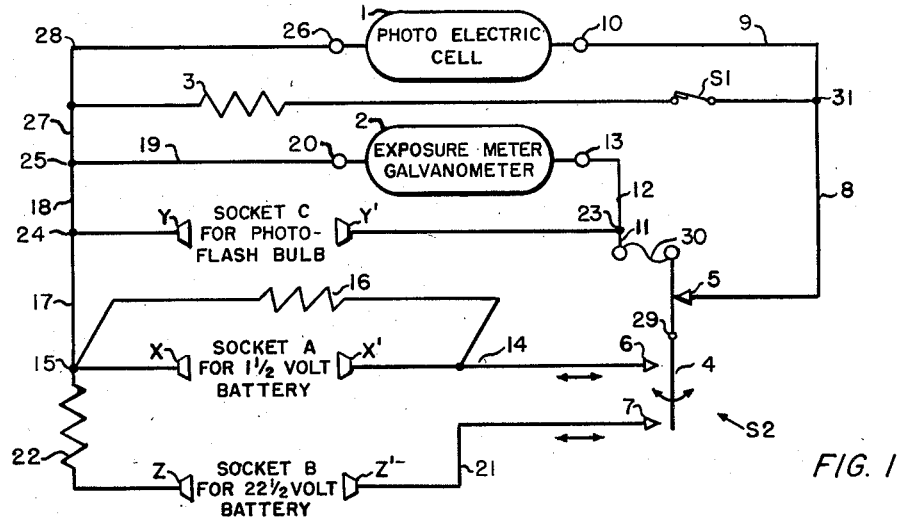
Fig. 1 is a schematic illustration of an embodiment of the invention.

Referring now to Fig. 1, the invention is disclosed in connection with a conventional exposure meter which comprises a photoelectric cell 1, a galvanometer 2 and a shunt resistor 3, all electrically connected as shown in Fig. 1. A normally closed switch S1 serves to disconnect shunt resistor 3 from the circuit to provide low range for the exposure meter. The above elements serve to provide a reading of light values for determining exposure times.

In accordance with the invention, there is further provided means for testing 1½ volt batteries used in low voltage flashguns and 22½ volt batteries used in battery-capacitor type flashguns. The said means operates in combination with the galvanometer of the exposure meter.

A switching means S2 comprises three pairs of contacts 4—5, 4—6 and 4—7, contact 4 being, of course, common to each pair. Resilient means (not shown) maintain contacts 4—5 normally closed and contacts 4—6 and 4—7 normally open by forcing common contact 4 against stationary contact 5. It will be noted that common contact 4 is pivoted at point 29 and is connected to conductor 11 by a conductive flexible member 30. Insertion of a battery into socket A will force movable contact 6 to the right, as seen in the figure, thereby engaging and forcing the lower end of contact 4 to the right. Because of pivot point 29, the upper end of contact 4 is moved to the left thereby opening contacts 4—5. Upon removal of the battery, contact 6 is withdrawn to its previous position by the resilient means and common contact 4 swings back against stationary contact 5, as before.

Switch contact 5 is connected by conductors 8 and 9 to terminal 10 of photocell 1. One end of common contact 4 is connected by conductors 11 and 12 to terminal 13 of the exposure meter galvanometer, the other end of common contact 4 being disposed in spaced relationship to switch contacts 6 and 7. Switch contact 6 is connected to terminal $x'$ of battery socket A by conductor 14, the other terminal $x$ being connected to junction point 15. One terminal of a resistor 16 is connected to conductor 14 and the remaining terminal to junction point 15. Resistor 16 thereby serves as a shunt resistor for galvanometer 2. Junction point 15 is connected to the remaining terminal 20 of galvanometer 2 by conductors 17, 18 and 19.

Switch contact 7 is connected by conductor 21 to one terminal $z'$ of battery socket B, the remaining terminal $z$ being connected to one end of resistor 22. The other end of resistor 22 is connected to junction point 15, thereby placing resistor 22 in series with contact 7 and battery socket B.

The above outlined elements and connections comprise the battery tester of this invention, the operation of which will be described hereinafter.

In accordance with this invention, there is further provided a means for testing the continuity of photoflash bulbs. The said means operates in combination with the photoelectric cell of the exposure meter.

A photoflash bulb socket C is provided with contacts $y$, $y'$. Contact $y'$ is connected to junction point 23 and the second contact $y$ is connected to junction point 24, thereby placing socket C across the galvanometer 2 by means of conductors 18, 19 and 12. Junction point 25 is connected to terminal 26 of photocell 2 by conductors 27 and 28.

The above elements comprise the photoflash bulb continuity tester, the operation of which will be described below.

The operation of the photographic multimeter in performing the functions of exposure meter, battery tester and continuity tester will now be described.

Operation as an exposure meter is in the conventional manner. Photoelectric cell 1 converts the light striking it into an electric current. This electric current operates galvanometer 2 to provide an indication of light value on indicator scale 60 (Fig. 3), as is well known. Electric current flows from terminal 10 of photoelectric cell 1 via conductors 9 and 8 to closed contacts 4—5, thence to terminal 13 via conductors 30, 11 and 12, through galvanometer 2 to terminal 20 and back to photoelectric cell 1 via conductors 19, 27 and 28 to terminal 26.

In utilizing the multimeter of this invention as a battery tester, the battery to be tested is inserted into the socket A or B, socket A being provided for 1½ volt batteries and socket B for 22½ volt batteries.

To test a 1½ volt battery of the type used in low voltage flashguns, the battery is inserted into socket A. Upon insertion of the battery, contacts 4—5 open and then contacts 4—6 close. Contacts 4—7 remain open. Current from the battery divides into two paths. A portion of the current flows from terminal $x$ of socket A through resistor 16 and returns to the other terminal $x'$, the remaining portion flows from terminal $x$ to terminal 20 of galvanometer 2 via conductors 17, 18 and 19, through the galvanometer and thence via terminal 13, conductors 12, 11, flexible conductor 30, which contacts 4—6 and conductor 14 to the other terminal $x'$ of socket A. The battery current divides between the galvanometer 2 and shunt resistor 16 in inverse proportion to their resistances. Resistor 16 is deliberately chosen of such low value as to load the battery heavily, for the reason that low voltage flashguns utilizing such batteries require several amperes in order to function properly. Resistor 16, therefore, serves to draw the heavy current which the battery would be required to deliver to a flashgun. Resistor 16 further serves as a shunt resistor for galvanometer 2 to prevent damage thereto. Sufficient current flows through galvanometer 2 to provide a suitable deflection of galvanometer needle 61 (Fig. 3) upon insertion into socket A of a battery in good condition. Although the galvanometer indicator scale 60 (Fig. 3) reads light values, the extent of deflection will indicate the condition of the battery inserted into socket A since the extent of deflection of galvanometer needle 61 is calibrated to indicate the current delivered by the battery. Upon removal of the battery, contacts 4—6 open and then contacts 4—5 close thereby returning the circuits to the conditions prior to insertion of the battery into socket A.

To test a 22½ volt battery of the kind used in battery-capacitor type flashguns, the battery is inserted into socket B. Upon insertion of the battery, contacts 4—5 open and then contacts 4—7 close. Contacts 4—6 remain open. Current flows from terminal $z$, through resistor 22 and to terminal 20 of galvanometer 2 via junction point 15 and conductors 17, 18 and 19. The current then flows through galvanometer 2 to terminal 13 and then via conductors 12, 11 and 30, contacts 4—7 and conductor 21 to terminal $z'$. The extent of deflection of galvanometer needle 61 (Fig. 3) is calibrated to indicate the voltage of the battery inserted into socket B. The high resistance of resistor 22 limits the maximum current drawn from the battery to a safe value and also limits the current flowing through the galvanometer thereby preventing damage thereto while allowing the relatively sensitive movement to indicate the voltage of the battery.

In utilizing the multimeter of this invention as a photoflash bulb continuity tester, the instrument is pointed toward any source of light which will provide a moderate or full scale deflection on galvanometer 2. The base contacts of the photoflash bulb to be tested are then connected or touched to contacts $y$, $y'$. The low resistance of the flashbulb will cause a decrease in deflection on galvanometer 2. If the flashbulb circuit is open, no decrease in deflection will occur. It will be noted that a battery is not required. The output of photoelectric cell 1, a normal component of the conventional exposure meter, is utilized for the test. Under no conditions could the output of the photoelectric cell be sufficient to fire the flashbulb. The output, however, is sufficient to determine whether or not continuity exists.

Figure 2:
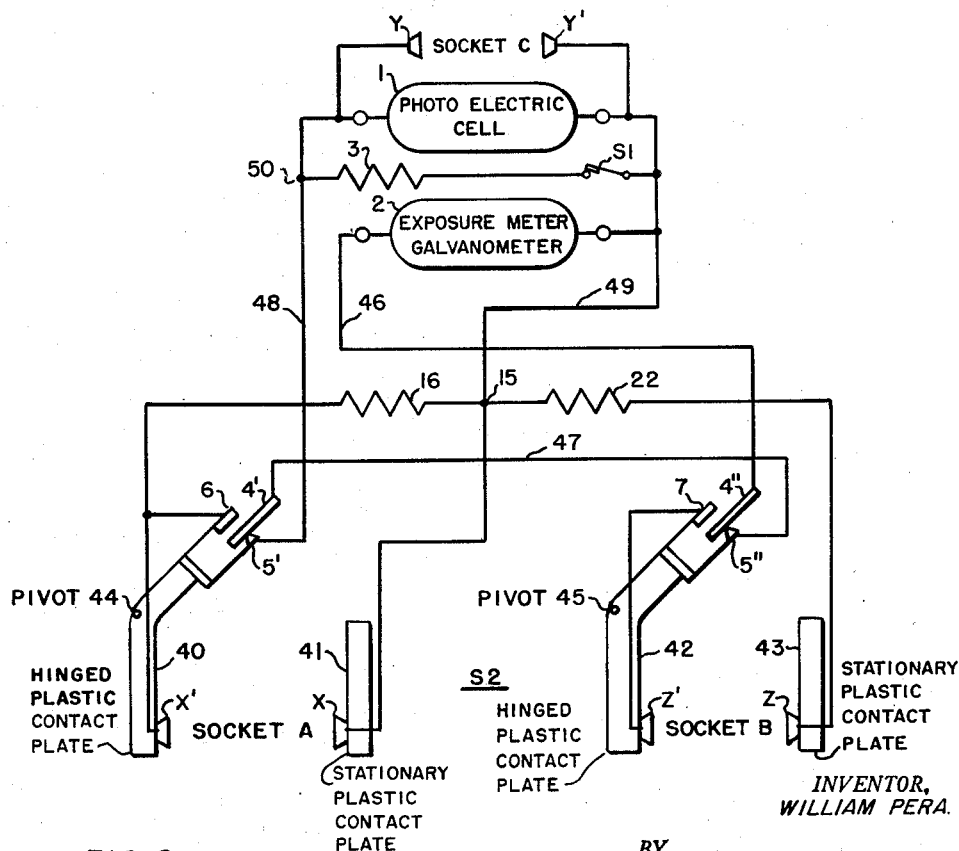
Fig. 2 is a diagrammatic illustration of the preferred embodiment of the invention.

Fig. 2 of the drawing is a schematic diagram of the preferred embodiment of the invention illustrated in Fig. 1, corresponding elements of Figs. 1 and 2 being designated by the same reference numerals.

The switch means S2 comprises four plastic contact plates 40, 41, 42 and 43. Contact plates 40 and 42 are hinged by means of pivots 44 and 45 while contact plates 41 and 43 are stationary. Switch contacts 4', 5' and 6 are associated with hinged plate 40 and switch contacts 4", 5" and 7 are associated with hinged plate 42. Contacts 6 and 7 correspond to contacts 6 and 7 of Fig. 1 and contacts 4', 5' and 4", 5" correspond to switch contacts 4, 5 of Fig. 1. The remaining elements of Fig. 2 correspond to like elements of Fig. 1. Resilient means (not shown) maintain hinged plates 40 and 42 in the positions shown in Fig. 2. Contacts 4', 4" are stationary whereas contacts 5', 6, 5" and 7, being physically attached to their respective hinged plates 40 and 42, are movable.

Operation of the embodiment of Fig. 2 as an exposure meter is self-evident. Since contacts 4', 5' and 4", 5" are normally held closed, as shown, electric current from photoelectric cell 1 flows through galvanometer 2, conductor 46, contacts 4", 5", conductor 47, contacts 4', 5' and back to photoelectric cell 1 via conductor 48.

In testing 1½ volt batteries, the battery is inserted into socket A forcing contact $x'$ and the lower portion of hinged plate 40 to the left, as seen in Fig. 2. The upper portion of hinged plate 40 is thereby forced downward and to the right, whereby contacts 4'—5' are opened and then contacts 4'—6 are closed. Contacts 4", 5" and 7 remain as shown. The current flow is identical to that of the Fig. 1 embodiment. Briefly, current flows from terminal $x$ to junction point 15. Thereafter the current divides, a portion flowing through resistor 16 and closed contacts 4'—6 to terminal $x'$, the remaining portion flowing from junction point 15 through conductor 49, galvanometer 2, conductor 46, contacts 4"—5", conductor 47 and closed contacts 4'—6 terminal $x'$. Upon removal of the battery, contacts 4'—6 open and then contacts 4'—5' close thereby returning the circuit to its original condition.

In testing 22½ volt batteries, the insertion of the battery into socket B opens contacts 4"—5" and then closes contacts 4"—7. Current flows from terminal $z$ through resistor 22 to junction point 15, thence via conductor 49 through galvanometer 2, conductor 46 and closed contacts 4"—7 to terminal $z'$. Removal of the battery will, of course, return the circuit to its original condition.

The continuity tester of Fig. 2 operates in a manner substantially identical to that of the embodiment of Fig. 1. Since contacts 4'—5' and 4"—5" are normally closed, current from the photoelectric cell will provide a deflection on galvanometer 2 so that, when a photoflash bulb is inserted into socket C, a decrease in deflection will occur provided the flashbulb circuit is not open. Socket C may be placed across conductors 46 and 49 rather than in the position shown in Fig. 2, if desired.

Figure 3:
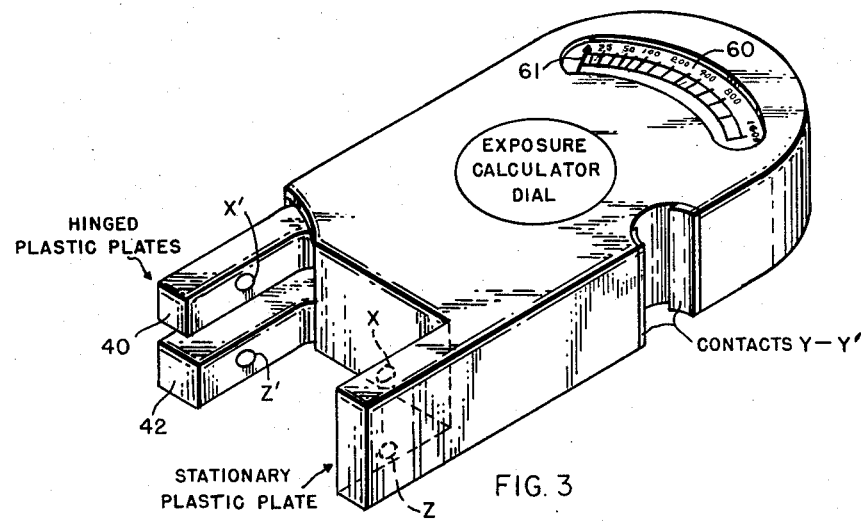
Fig. 3 is a perspective view of a photographic multimeter in accordance with this invention.

Fig. 3 is a perspective view of the preferred embodiment of the photographic multimeter of this invention and illustrates hinged plates 40 and 42, contacts $y$ and $y'$, scale 60 and galvanometer indicator needle 61.

Figure 4:
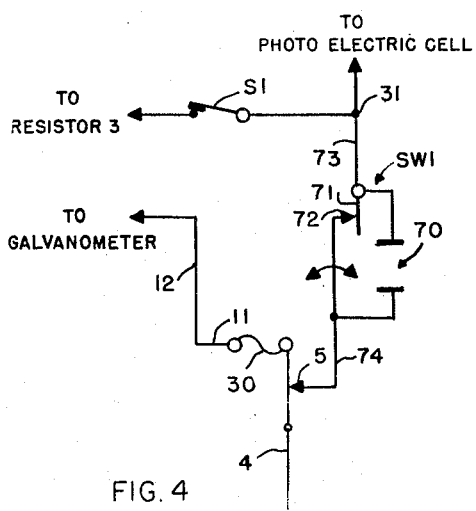
Fig. 4 is a schematic illustration of a modification of the embodiment of Fig. 1.

A modification of Fig. 1 is disclosed in Fig. 4 in which only those elements of Fig. 1 which are necessary to the understanding of the modification are shown. The modification concerns the continuity tester. Instead of socket C there is utilized a combined socket and switch generally designated SW1 and comprising socket 70 and switch contacts 71 and 72. Resilient means (not shown) holds switch contacts 71 and 72 normally closed. SW1 is connected to junction point 31 and switch contact 5 by means of conductors 73 and 74, i.e. in place of conductor 8 of Fig. 1. Since contacts 71 and 72 are normally closed, the operation of this modification as an exposure meter and battery tester is identical to that of Fig. 1. In operation as a continuity tester, insertion of the photoflash bulb into socket 70 will open contacts 71—72 by forcing contact 72 away from contact 71, thereby placing the photoflash bulb in series with galvanometer 2 and photoelectric cell 1. A closed circuit photoflash bulb will reduce the deflection on galvanometer 2 slightly. An open circuit photoflash bulb will, of course, reduce the deflection to zero since the result will be an open circuit, contacts 71 and 72 being open and the photoflash bulb being open.

Figure 5:
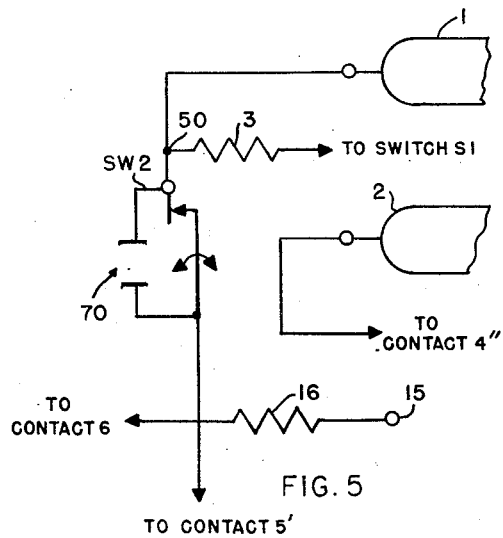
Fig. 5 is a schematic illustration of a modification of the embodiment of Fig. 2.

Fig. 5 discloses a similar modification of the embodiment of Fig. 2. Combined socket and switch SW2 is identical to SW1 and is connected between junction point 50 and switch contact 5' thereby placing SW2 in series with galvaometer 2 and photocell 1. As with the Fig. 4 modification, a closed circuit photoflash bulb will decrease the galvanometer deflection and an open circuit photoflash bulb will reduce the deflection to zero.

Demonstration of the photographic multimeter of this invention indicates several advantages to be realized from its use.

*Convenience of size.*—The device lends itself to manufacture as a self-contained multimeter or as an adapter which can be attached to modified exposure meters. The resulting increase in size in the case of the self-contained instrument is not objectionable.

*Convenience of operation.*—The ease with which tests of dry cells, batteries and flash bulbs can be performed appeals to photographers since proper checks of equipment can be made at the proper intervals with one instrument rather than with several instruments.

The accuracy provided by the meter circuit of the galvanometer exceeds that of meters normally offered to the photographic trade as battery testers.

Since few additional items are required for the conversion of existing exposure meters to the photographic multimeter of this invention, the slight increase in cost over the existing exposure meter is more than compensated for by the saving over the cost of providing separate battery and flashbulb continuity testers.

While the invention has been described with reference to the structures shown, it is not restricted to the details herein disclosed and this application is intended to cover such modifications or departures as may come within the scope of the following claims:

What is claimed is:

1. A combined exposure meter and battery tester comprising, in combination, a light responsive current generating means, an indicating means, means connecting said current generating means and said indicating means, socket means for receiving a battery to be tested, and means disconnecting said connecting means from said indicating means and connecting said socket means thereto in response to insertion of said battery into said socket means, said disconnecting means comprising a movable portion of said socket means operatively connected to said connecting means.

2. Apparatus according to claim 1 further comprising means for limiting the current flow to said indicating means.

3. Apparatus according to claim 2 in which said limiting means comprises a resistor connected across the terminals of said socket means.

4. Apparatus according to claim 2 in which said limiting means comprises a resistor connected in series with said socket means.

5. A combined exposure meter and battery tester comprising a photoelectric cell, a galvanometer, switch means including at least a first and a second pair of contacts, said first pair of contacts being normally closed and connecting said photocell and said galvanometer, said second pair of contacts being normally open, at least one socket means for receiving a battery to be tested, said second pair of contacts being connected to said socket and to said galvanometer and means opening said first pair of contacts and closing said second pair of contacts in response to insertion of said battery into said socket means.

6. Apparatus as claimed in claim 5 further comprising resistor means for limiting the current to said galvanometer.

7. Apparatus as claimed in claim 6 in which the said resistor means is connected across the terminals of said socket means.

8. Apparatus as claimed in claim 6 in which the said resistor means is connected in series with said socket means.

9. A photographic multimeter comprising a light responsive current generating means, an indicating means, means connecting said current generating and said indicating means, socket means connected to said current generating means to receive current from said current generating means upon insertion of a closed circuit lamp therein, second socket means for receiving a battery to be tested and means disconnecting said connecting means from said indicating means and connecting said second socket means thereto in response to insertion of said battery into said second socket means, said disconnecting means comprising a movable portion of said second socket means operatively coupled to said connecting means.

10. A device according to claim 9 further comprising means for limiting the current flow to said indicating means.

11. A photographic multimeter comprising a photoelectric cell, a galvanometer, switch means including at least a first and a second pair of contacts, said first pair of contacts being normally closed and connecting said photocell and said galvanometer, said second pair of contacts being normally open, lamp socket means connected through said first pair of contacts to said photoelectric cell and said galvanometer, said lamp socket means receiving current from said photoelectric cell upon insertion therein of a closed circuit lamp, at least one socket means for receiving a battery to be tested and means including said second pair of contacts for opening said first pair of contacts and closing said second pair of contacts in response to insertion of said battery into said socket means.

12. A photographic multimeter according to claim 11 further provided with means for limiting the current flow to said galvanometer.

References Cited in the file of this patent

UNITED STATES PATENTS

| | | |
|---|---|---|
| 2,131,351 | Little | Sept. 27, 1938 |
| 2,153,990 | Paulson | Apr. 11, 1939 |
| 2,471,001 | Miller | May 24, 1949 |
| 2,708,735 | Sparr | May 17, 1955 |

FOREIGN PATENTS

| | | |
|---|---|---|
| 921,937 | France | Jan. 20, 1947 |
| 693,253 | Great Britain | June 24, 1953 |